US011993982B2

(12) United States Patent
Garcia Garcia

(10) Patent No.: US 11,993,982 B2
(45) Date of Patent: May 28, 2024

(54) ROLLER BLIND STRUCTURE

(71) Applicant: BANDALUX INDUSTRIAL, S.A., Pontevedra (ES)

(72) Inventor: Emiliano Garcia Garcia, Pontevedra (ES)

(73) Assignee: BANDALUX INDUSTRIAL, S.A., Pontevedra (ES)

( * ) Notice: Subject to any disclaimer, the term of this patent is extended or adjusted under 35 U.S.C. 154(b) by 112 days.

(21) Appl. No.: 17/504,742

(22) Filed: Oct. 19, 2021

(65) Prior Publication Data

US 2022/0195797 A1 Jun. 23, 2022

(30) Foreign Application Priority Data

Dec. 23, 2020 (ES) ............................ ES202032779U

(51) Int. Cl.
*E06B 9/58* (2006.01)
*E06B 9/42* (2006.01)

(52) U.S. Cl.
CPC .................. *E06B 9/58* (2013.01); *E06B 9/42* (2013.01); *E06B 2009/587* (2013.01)

(58) Field of Classification Search
CPC ........ E06B 9/58; E06B 9/42; E06B 2009/587; E06B 9/68
See application file for complete search history.

(56) References Cited

U.S. PATENT DOCUMENTS

| | | | | |
|---|---|---|---|---|
| 2002/0100562 | A1* | 8/2002 | Ikle | E06B 9/11 160/120 |
| 2019/0048658 | A1* | 2/2019 | Garcia Hernandez | E06B 9/58 |
| 2021/0148165 | A1* | 5/2021 | Diamond | E06B 9/58 |
| 2022/0049547 | A1* | 2/2022 | Greening | E06B 9/50 |

FOREIGN PATENT DOCUMENTS

| | | | | |
|---|---|---|---|---|
| CN | 102733749 | A * | 10/2012 | |
| DE | 9302394 | U1 | 5/1993 | |
| EP | 2053193 | A1 * | 4/2009 | E06B 9/42 |
| EP | 2264272 | A1 | 12/2010 | |
| GB | 2548229 | A * | 9/2017 | E06B 9/42 |
| WO | 202005345 | A1 | 1/2020 | |

* cited by examiner

*Primary Examiner* — Beth A Stephan
(74) *Attorney, Agent, or Firm* — Hassan Abbas Shakir; Shakir Law PLLC

(57) ABSTRACT

A roller blinds structure, having a casing provided with side walls that define an inner chamber intended to house drive means linked to a blind or similar, and guide profiles able to be located at opposite ends of the casing, which are configured to guide the blind or similar, the guide profiles being intended to extend in a downward direction with respect to the positioning of the casing, including an attachment system to attach each one of the guide profiles and the casing. The attachment system includes a first interconnection member able to be coupled to one end of the casing by means of fixing means and a connector member able to be coupled to the first interconnection member by means of first releasable quick-fit means and able to be coupled to a respective guide profile by means of second releasable quick-fit means.

9 Claims, 4 Drawing Sheets

ROLLER BLIND STRUCTURE

OBJECT OF THE INVENTION

The object of the present application is to provide a roller blind structure.

More specifically, the invention proposes the development of a roller blind structure, in which the guide profiles are attached to the casing by means of quick coupling means, which facilitate the assembly and disassembly thereof.

BACKGROUND OF THE INVENTION

Structures for roller blinds are well known today, mainly comprising a casing made up of a plurality of side walls that define an internally hollow box, intended to incorporate drive means therein (such as, for example, the rotation shaft, an electric motor and other components to carry out the winding and unwinding movement of the blind) linked to a blind or similar, and a pair of guide profiles located at the two opposite ends of the casing, which are configured to facilitate the guiding of the blind during the descent and lifting thereof.

However, in the known art the guide profiles are coupled to the casing by means of adhesive means or by means of screw elements that can make it difficult to disassemble the casing with respect to the guide profiles in the event that the separation thereof is necessary.

Document no. EP2264272 A1 is known in the state of the art, which describes a mechanism for blinds exhibiting a system for winding the blind housed in a casing, including guide profiles able to be located at opposite ends of the casing, which are configured to guide the blind or similar.

Other examples of a similar roller blind structure are described in DE9302394U1 and WO202005345A1.

Thus, there is currently no knowledge of an invention that has all the features that are described in this specification, so there is a need to overcome the aforementioned drawbacks, facilitating the assembly and disassembly of the structure, as well as simplifying the construction of the same.

DESCRIPTION OF THE INVENTION

The present invention has been developed with the aim of providing a roller blind structure which is configured as a novelty within the field of application and solves the aforementioned drawbacks, further contributing other additional advantages which will be obvious from the description below.

An object of the present invention is to therefore provide a roller blind structure, comprising a casing made up of a plurality of side walls that define an inner chamber intended to incorporate drive means therein linked to a blind or similar, and guide profiles able to be located at opposite ends of the casing, which are configured to guide the similar blind, the profiles being intended to extend in a downward direction with respect to the positioning of the casing. In particular, the invention is characterised by comprising an attachment system to attach each one of the guide profiles and the casing, provided with a first interconnection member able to be coupled to one end of the casing by means of fixing means and a connector member able to be coupled to the first interconnection member by means of first releasable quick-fit means and able to be coupled to a respective guiding profile by means of second releasable quick-fit means.

Furthermore, the aforementioned first releasable quick-fit means consist of a flexible retaining flange able to be fitted in a housing with shapes and dimensions complementary to the retaining flange, the housing being made in an upper region of the connector member.

Thanks to these features, it is possible to simplify and facilitate the assembly and disassembly operations of the casing wherein the drive means of the blind are mounted, with respect to the guide profiles. In this way, the assembly and disassembly time for the user or operator is also reduced.

According to another aspect of the invention, the fixing means may comprise orifices made in the first interconnection member and housings made inside the body of the casing, the orifices and the housings being configured to insert screw elements.

Additionally, the first interconnecting member includes an extension with a substantially smooth shape.

Advantageously, the first interconnection member may include a ramp section located below the extension configured to enable the release movement of the retaining flange.

Preferably, the interconnection member is made from a single part of injection mouldable plastic material.

The roller blind structure described therefore represents an innovative structure with structural and constituent features heretofore unknown for its intended purpose, reasons which, taken together with its usefulness, provide it with sufficient grounds for obtaining the requested exclusivity privilege.

Other features and advantages of the roller blind structure object of the present invention will become apparent from the description of a preferred but not exclusive embodiment illustrated by way of non-limiting example in the attached drawings, in which:

DESCRIPTION OF A PREFERRED EMBODIMENT

Figure 1:
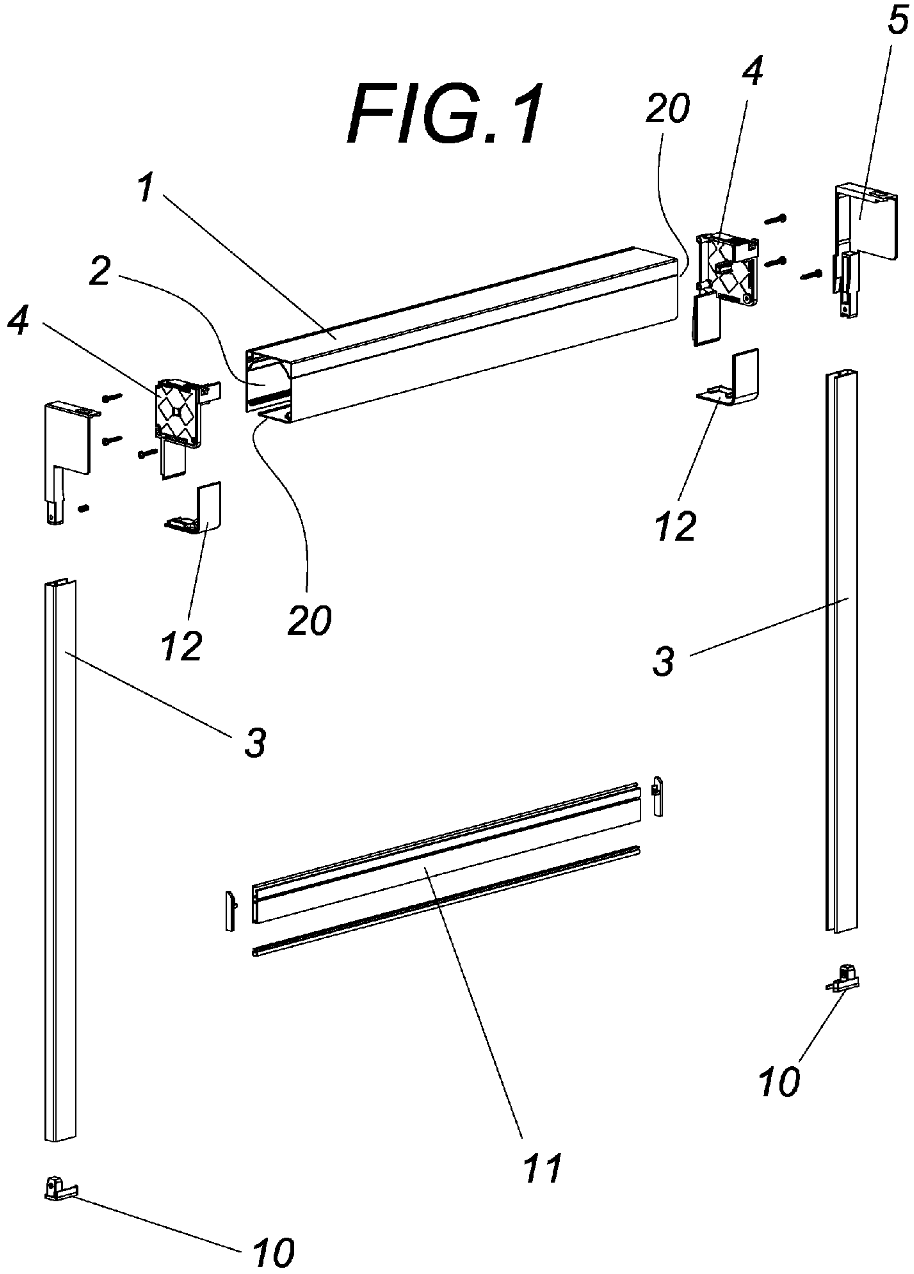
FIG. 1 is an exploded perspective view of the roller blind structure according to the invention.

In light of the aforementioned figures, and in accordance with the adopted numbering, one may observe therein a preferred exemplary embodiment of the invention, which comprises the parts and elements indicated and described in detail below.

As can be seen in the figures, a roller blind structure can be seen, which comprises a casing (1) (generally having a rectangular prismatic shape) made up of a part defined by a plurality of elongated side walls that define an inner chamber (2) with the opposite ends (20) open, being intended to incorporate drive means therein (not shown) linked to a blind or similar (not shown).

Furthermore, guide profiles (3) are provided, both identical to each other, each one of them able to be coupled in a corresponding end of the casing (1), which are configured to guide the similar blind, these guide profiles (3) being intended to extend in a downward direction perpendicular to the positioning of the casing (1).

The drive means and the blind have not been shown since they are not objects of this invention, although any system currently known in the state of the art can be used. In this way, these drive means can comprise, for example, a winding drum wherein the blind is held by the upper end thereof, the winding drum being driven by a transmission shaft or wheel linked to an electric motor housed inside the casing (1) itself.

It should be mentioned that each one of the guide profiles (3) exhibit an elongated profile, which can be metallic or any other suitable material conventionally used, with a U-shaped cross section that defines an inner hollow region.

The structure further comprises an attachment system intended to attach each one of the guide profiles (3) and the casing (1) to each other in a simple and releasable way, being provided with a first interconnection member (4) able to be coupled to an end of the casing by means of fixing means and a connector member (5) able to be coupled to the first interconnection member by means of first releasable quick-fit means and able to be coupled to a respective guide profile (3) by means of second releasable quick-fit means.

Figure 2:
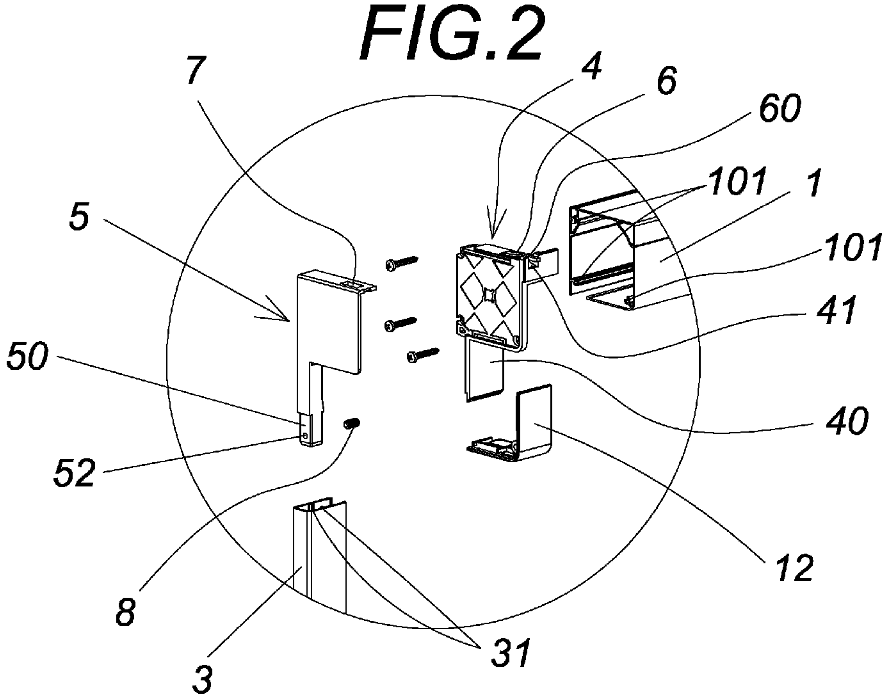
FIG. 2 is an exploded detailed perspective view of the attachment system seen from one side.
Figure 3:
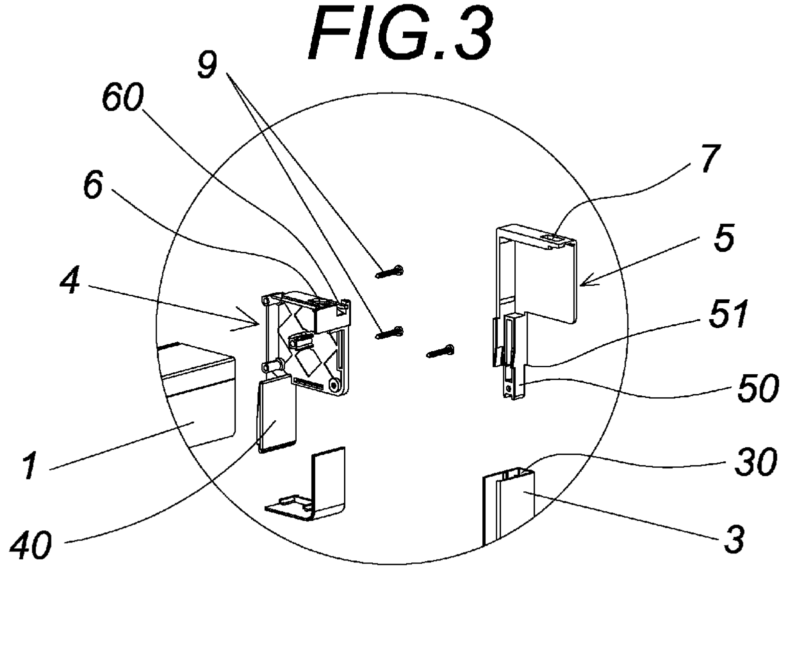
FIG. 3 is an exploded detailed perspective view of the attachment system seen from the opposite side to that shown in FIG. 2.

With particular reference to the first releasable quick-fit means, they consist of a flexible retaining flange (6) able to be fitted in a housing (7) with shape and dimensions complementary to the retaining flange (6), the housing being made in an upper region of the connector member (5), as can be seen in FIG. 2.

Figure 5:
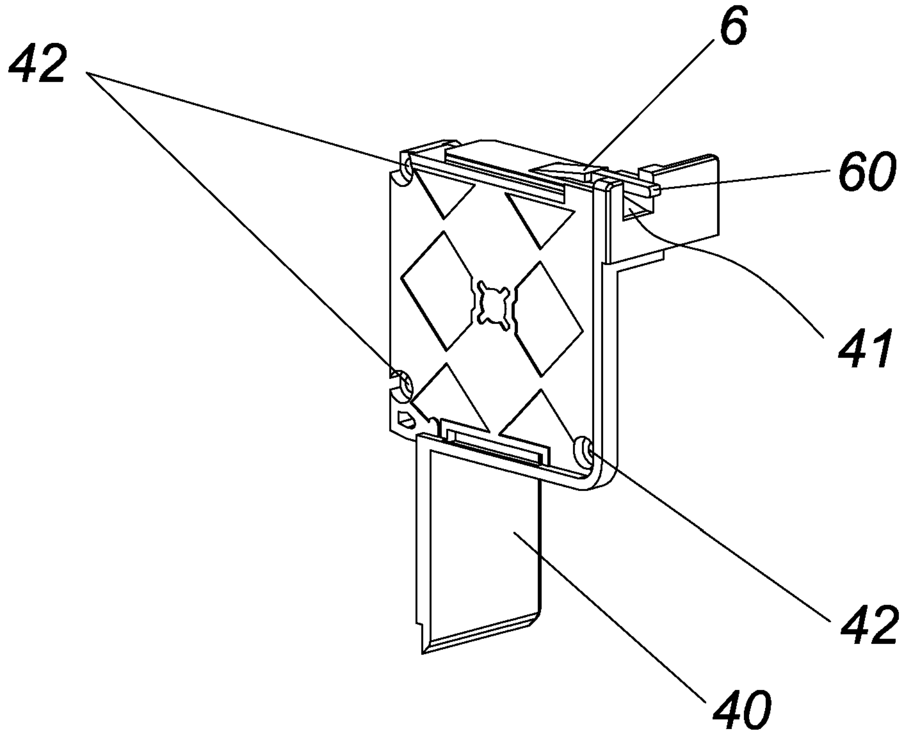
FIG. 5 is an enlarged detailed perspective view of the interconnection member.

Advantageously, the retaining flange (6) includes an extension (60) (see FIG. 5 in detail) that protrudes outward through an open portion made in the first interconnection member (4), which facilitates the bending of the flange (6) to separate it from the window (7), and thus facilitate the separation of the casing (1) with respect to the guide profile (3). It should be mentioned that the first interconnection member (4) includes a ramp section (41) located below the extension (60) which limits the movement or bending angle of the extension (60).

Now, as regards the aforementioned second releasable quick-fit means, they consist of a male extension (50) able to be coupled to a female region (30) present in the guide profile (3), which corresponds to the inner hollow defined by projections (31) present inside the guide profile (3) itself.

It should be mentioned that the male extension (50) includes steps (51) that define a abutting surface intended to contact the upper edge of the corresponding guide profile (3). Furthermore, the male extension (50) includes an internally threaded through orifice (52), transversely passing through the male extension (50), which is intended for inserting a threaded pin (8), which is not visible when the structure is fully assembled.

Moreover, the fixing means comprise a plurality of orifices (42), more specifically three orifices (42), made in the first interconnection member (4) (see FIG. 5) and housings (101) made inside the body of the casing (1). The orifices (42) and the housings are configured in such a way that they enable screw elements (9) to be inserted by being aligned when the components are assembled.

Figure 4:
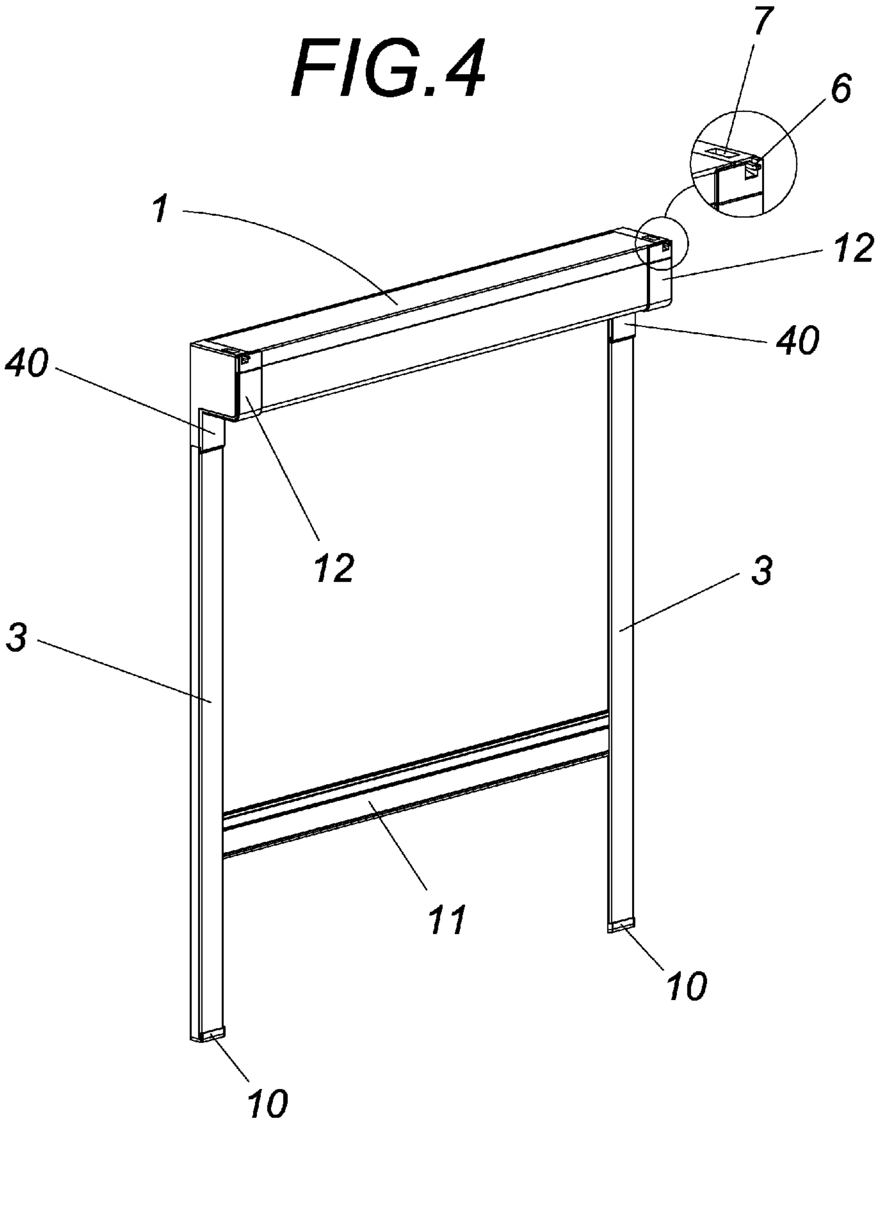
FIG. 4 is a perspective view of the roller blind structure in an assembled condition.

The first interconnection member (4) includes an extension (40) that protrudes downwards and is positioned in front of the male extension (50) once the structure is assembled, so that it is not visible, as can be seen in FIG. 4.

In order to cover the open lower portion of each one of the guide profiles (3), a cover (10) is provided, made of any suitable material, for example, plastic, metal, which is coupled by means of an interlocking relationship, so that it prevents the entry and accumulation of dirt on the inner portion (not visible on the outside) of the guide profiles (3). The interlocking relationship is determined by a projection (see FIG. 1) that interlocks in the female region (30) present in the guide profile (3).

Additionally, the structure includes a profile (11) located in the lower portion and between the two guide profiles (3).

Finally, a pair of L-shaped access covers (12) are provided mounted on the casing (1) by means of a snap fit, at least one of them being removable to facilitate the insertion of a connector able to be coupled to the electric motor that is part of the drive means.

The details, shapes, dimensions and other complementary elements used in the blinds structure of the invention may be suitably replaced with others that do not depart from the scope defined by the claims below.

The invention claimed is:

1. A roller blind structure comprising:

a casing made up of a plurality of side walls that define an inner chamber intended to incorporate drive means therein for use with a blind, and guide profiles able to be located at opposite ends of the casing, which are configured to guide the blind, wherein the guide profiles extend in a downward direction with respect to the positioning of the casing, including an attachment system to attach each one of the guide profiles and the casing, wherein the attachment system is provided with a first interconnection member able to be coupled to an end of the casing by means of fixing means and a connector member able to be coupled to the first interconnection member by means of first releasable quick-fit means and able to be coupled to one of the guide profiles by means of second releasable quick-fit means, and wherein the first releasable quick-fit means consist of a flexible retaining flange able to be fitted in a housing having shapes and dimensions complementary to the retaining flange, the housing being made in an upper region of the connector member.

2. The roller blind structure according to claim 1, wherein the retaining flange includes an extension that protrudes outward through an open portion made in the first interconnection member.

3. The roller blind structure according to claim 1, wherein the second releasable quick-fit means consists of a male extension able to be coupled to a female region present in one of the guide profiles.

4. The roller blind structure according to claim 1, wherein a male extension includes steps that define an abutting surface intended to come into contact an upper edge of one of the guide profiles.

5. The roller blind structure according to claim 3, wherein the male extension includes a threaded through orifice intended for the insertion of a threaded pin.

6. The roller blind structure according to claim 1, wherein the fixing means comprise orifices made in the first interconnection member and housings made inside a body of the casing, the orifices and the housings in the body being configured to insert screw elements.

7. The roller blind structure according to claim 2, wherein the first interconnection member includes an extension with a substantially smooth shape.

8. The roller blind structure according to claim 1, wherein the first interconnection member includes a ramp section located below an extension configured to enable the release movement of the retaining flange.

9. The roller blind structure according to claim 1, wherein the interconnection member is made from a single part of injection mouldable plastic material.

* * * * *